(12) United States Patent
Coulter

(10) Patent No.: US 9,319,880 B2
(45) Date of Patent: Apr. 19, 2016

(54) REFORMATTING DATA TO DECREASE BANDWIDTH BETWEEN A VIDEO ENCODER AND A BUFFER

(75) Inventor: Michael L. Coulter, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 611 days.

(21) Appl. No.: 12/882,266

(22) Filed: Sep. 15, 2010

(65) Prior Publication Data

US 2012/0063509 A1     Mar. 15, 2012

(51) Int. Cl.
    *H04W 12/06*     (2009.01)
    *H04N 19/426*     (2014.01)
    *H04N 19/43*     (2014.01)

(52) U.S. Cl.
    CPC ............. *H04W 12/06* (2013.01); *H04N 19/428* (2014.11); *H04N 19/43* (2014.11)

(58) Field of Classification Search
None
See application file for complete search history.

(56) References Cited

U.S. PATENT DOCUMENTS

| | | | |
|---|---|---|---|
| 5,623,311 A * | 4/1997 | Phillips et al. | 375/240.25 |
| 5,644,306 A * | 7/1997 | Brent | 341/67 |
| 5,684,539 A * | 11/1997 | Boyce et al. | 375/240.24 |
| 5,748,240 A * | 5/1998 | Carr et al. | 375/240.01 |
| 6,170,049 B1 * | 1/2001 | So | 712/35 |
| 6,301,299 B1 * | 10/2001 | Sita et al. | 375/240.01 |
| 6,374,033 B2 | 4/2002 | Hoshi | |
| 6,563,953 B2 * | 5/2003 | Lin et al. | 382/233 |
| 6,799,246 B1 * | 9/2004 | Wise et al. | 711/117 |
| 6,895,475 B2 * | 5/2005 | Volpe et al. | 711/137 |
| 6,957,308 B1 * | 10/2005 | Patel | 711/154 |
| 6,990,247 B2 * | 1/2006 | Schwartz | 382/240 |
| 7,084,929 B2 * | 8/2006 | Lange et al. | 348/716 |
| 7,373,437 B2 * | 5/2008 | Seigneret et al. | 710/22 |
| 7,761,617 B2 * | 7/2010 | Seigneret et al. | 710/22 |
| 7,773,448 B2 * | 8/2010 | Kim et al. | 365/230.03 |
| 7,852,343 B2 | 12/2010 | Tanaka et al. | |
| 7,965,773 B1 * | 6/2011 | Schlanger et al. | 375/240.16 |
| 8,050,323 B2 * | 11/2011 | Demos | 375/240.15 |
| 8,271,824 B2 * | 9/2012 | Kuroki | 713/401 |
| 8,443,152 B2 * | 5/2013 | Lee et al. | 711/143 |
| 8,473,689 B2 * | 6/2013 | Anderson et al. | 711/137 |
| 2003/0099294 A1 * | 5/2003 | Wang et al. | 375/240.15 |
| 2004/0196632 A1 * | 10/2004 | Chen et al. | 361/697 |
| 2006/0023792 A1 * | 2/2006 | Cho et al. | 375/240.24 |
| 2007/0195113 A1 * | 8/2007 | Walton et al. | 345/649 |
| 2008/0025395 A1 * | 1/2008 | Nemiroff et al. | 375/240.12 |
| 2010/0039560 A1 * | 2/2010 | Han | 348/575 |

FOREIGN PATENT DOCUMENTS

| | | |
|---|---|---|
| JP | 2000-348168 | 12/2000 |
| JP | 2007-074412 | 3/2007 |

OTHER PUBLICATIONS

Open Core Protocol Specification. Release 2.1. Revision 1.0. (2005).*

(Continued)

*Primary Examiner* — Geepy Pe
(74) *Attorney, Agent, or Firm* — Trop, Pruner & Hu, P.C.

(57) ABSTRACT

A reference picture buffer may supply an asymmetric macroblock to a video encoder to improve the bandwidth between the encoder and buffer. The macroblock width may be sized to match the minimum burst width of the buffer. The size of the macroblock may be kept unchanged by reducing the macroblock height.

17 Claims, 3 Drawing Sheets

(56) References Cited

OTHER PUBLICATIONS

Leibson, Steve "An inconvinient truth about using DDR3 SDRAM for embedded designs" (Jun. 2010) Denali Memory Blog.*
PCT/US2011/050897 International Search Report with Written Opinion of the International Searching Authority mailed Apr. 9, 2012 (9 pgs).
Korean Patent Office, Korean Office Action issued in corresponding KR Application No. 2013-7009469 dated Jul. 24, 2014 [with English translation] (6 pages).
Taiwan Office Action, Taiwan Office Action issued in corresponding TW Application No. 100129048 dated Jul. 16, 2014 [with English translation] (12 pages).

* cited by examiner

Tn = TOP FIELD, MB LINE n
Bn = BOTTOM FIELD, MB LINE n
Ln = PROGRESSIVE, MB LINE n

REFORMATTING DATA TO DECREASE BANDWIDTH BETWEEN A VIDEO ENCODER AND A BUFFER

BACKGROUND

This relates generally to video encoders.

Video encoders are used to take video data and to encode it in a format which takes up less space. As a result, the bandwidth consumed between devices that transmit and receive video information may be used more efficiently or more data can be transmitted between those devices in the same time.

Conventionally, video data used by encoders is formatted in 16×16 blocks called macroblocks. The use of macroblocks is widely applied throughout the video compression field.

As a result, in most conventional operations, 16×16 macroblocks are utilized. For example, a memory may store reference (previously encoded) frames. The currently processed frame is compared to a reference frame to remove redundancies. The encoding process may rely on those reference frames, as well as differences between those reference frames and the currently processed frame. Typically, because video data is stored in 16×16 blocks, the 16×16 block format is used to store the reference frames in the memory used by the video encoder.

However, some memories, such as double data rate three (DDR3) static dynamic random access memories (see DDR3 SDRAM Standard, JESD79-3D, September 2009, available from JEDEC, Arlington, Va. 22201) provide, in response to a request for a macroblock of data, not one, but two, macroblocks. In fact, the fetches from the memory of the reference pictures consume the majority of the bandwidth between the encoder and the memory in typical video encoders.

Thus, every time a 16×16 macroblock from the reference picture is requested by the encoder, the memory may return two side-by-side, 16×16 macroblocks, instead of one 16×16 macroblock. This is because the minimum burst length of 32 bytes is specified in the DDR3 standard. The 32 bytes fetched from the DDR3 memory contains a 16 byte line in the requested macroblock and a 16 byte line in the macroblock to the right. The video encoder only consumes the requested 16×16 macroblock and the macroblock to the right is dropped. This results in the consumption of twice the bandwidth since every request for an individual 16×16 macroblock results in consuming the bandwidth of two macroblocks.

BRIEF DESCRIPTION OF THE DRAWINGS

FIG. 3 is a block format in accordance with one embodiment of the present invention; and FIG. 4 is a block format in accordance with another embodiment of the present invention.

DETAILED DESCRIPTION

In accordance with some embodiments, the aspect ratio of a macroblock stored in a video encoder reference picture buffer may be changed from a conventional width to a width that matches the minimum burst length of some memories, such as DDR3 memories. In some embodiments, the conventional macroblock width of 16 bytes and height of 16 lines may be changed to an asymmetric width of 32 bytes and a height of 8 lines in one embodiment. Then, two consecutive 16 byte lines in a 16×16 macroblock are remapped onto one 32 byte line (called a row due to distinguish "lines" in symmetrical (e.g. 16×16) and asymmetrical (e.g. 32×8) macroblocks) in a 32×8 macroblock. The new macroblock width of 32 bytes matches the minimum burst length of 32 bytes used by some memories, such as DDR3 memories.

The 16×16 macroblock is reformatted as a 32×8 macroblock so that it can be accessed in the reference picture buffer in eight 32 byte requests. Eight 32 byte requests return exactly 32×8 or 256 bytes from the memory, resulting in bandwidth efficiency in some embodiments.

In contrast, conventional video encoders using DDR3 memory receive 512 bytes in response to eight requests, resulting in twice the bandwidth consumption compared to some embodiments of the present invention.

Figure 1:
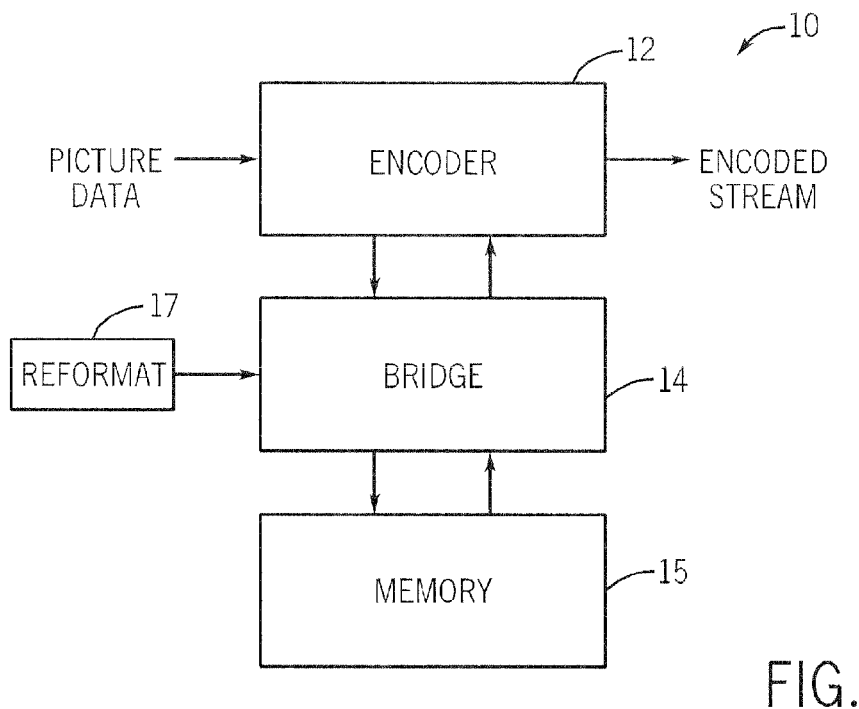
FIG. 1 is a schematic depiction of one embodiment of the present invention.

Referring to FIG. 1, a video encoding system 10 includes a video encoder 12. The video encoder 12 receives picture data and outputs an encoded stream. The encoder 12 writes out reference pictures as macroblocks, starting with the left hand corner of the picture frame. A bridge 14, that communicates with the video encoder, reformats the symmetrical macroblocks into asymmetrical macroblocks. The bridge may be a memory bridge in one embodiment. The reformatting may involve swizzling in one embodiment. A memory or buffer 15 then stores the reformatted macroblocks. The reference picture asymmetrical macroblocks read from the buffer 15 by the video encoder 12 are reformatted into symmetrical macroblocks by the bridge 14. In one embodiment, the buffer 15 may be any memory that has a minimum burst length longer than the width of the conventional 16×16 macroblock, including the DDR3 SDRAM memory with a 32 byte minimum burst length.

Of course, it is possible in the future that even larger burst lengths may be utilized and, in such case, corresponding adjustments in block asymmetry may be made. For example, if a reference picture buffer used 64 byte minimum burst lengths, the height or number of rows in the macroblock would simply be cut in half so that the reformatted macroblocks would be 64×4 pixels.

Figure 2:
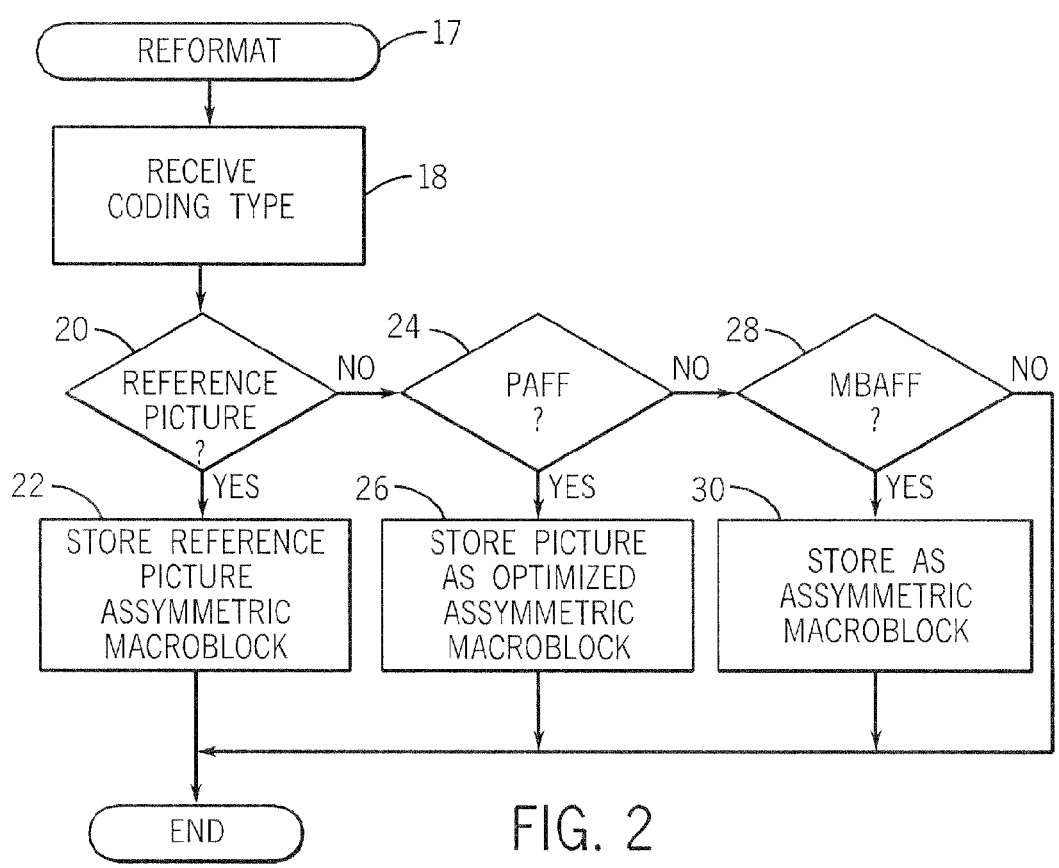
FIG. 2 is a flow chart for one embodiment.

Referring to FIG. 2, a sequence 17, which may be implemented by the bridge 14, in one embodiment, may be hardware, software, or firmware. In software embodiments, the sequence 17 may be implemented by instructions stored on a non-transitory computer readable medium. Those instructions may be executed by a suitable processor. For example, in a software embodiment, a storage may store the instructions. The storage may be a magnetic, optical, or semiconductor memory. Thus, for example, as one embodiment, the bridge 14 may include a storage that stores the instructions and a processor which executes them. In another embodiment, the sequence may be implemented as part of the encoder 12.

The sequence 17, shown in FIG. 2, initially determines (block 18) the type of coding involved. The bridge 14 typically already knows the mode the encoder 12 is in. If the coding needs reference pictures, as determined in diamond 20, then the reference pictures are stored in the buffer 14 as 32×8 macroblocks of a first type (block 22) in one embodiment. The reformatting in this case merely involved combining two lines at a time from the 16×16 macroblock to form each row of the 32×8 macroblock.

Otherwise, if the check at diamond 20 fails, a check at diamond 24 determines whether the system is using picture-adaptive frame-field encoding. If so, macroblocks are handled in 32×8 in format of a second type, as indicated in block 26. In picture-adaptive frame-field encoding, a frame may be written progressively and read back interlaced, as either a top or bottom field. A frame may also be written as interlaced and read back as progressive.

In another embodiment, a check at 28 may also be done for macroblock-adaptive frame-field (MBAFF) coding. In such case, the asymmetrical macroblock can be optimized for this type of encoding, in some embodiments, as indicated in block 30.

Figure 3:
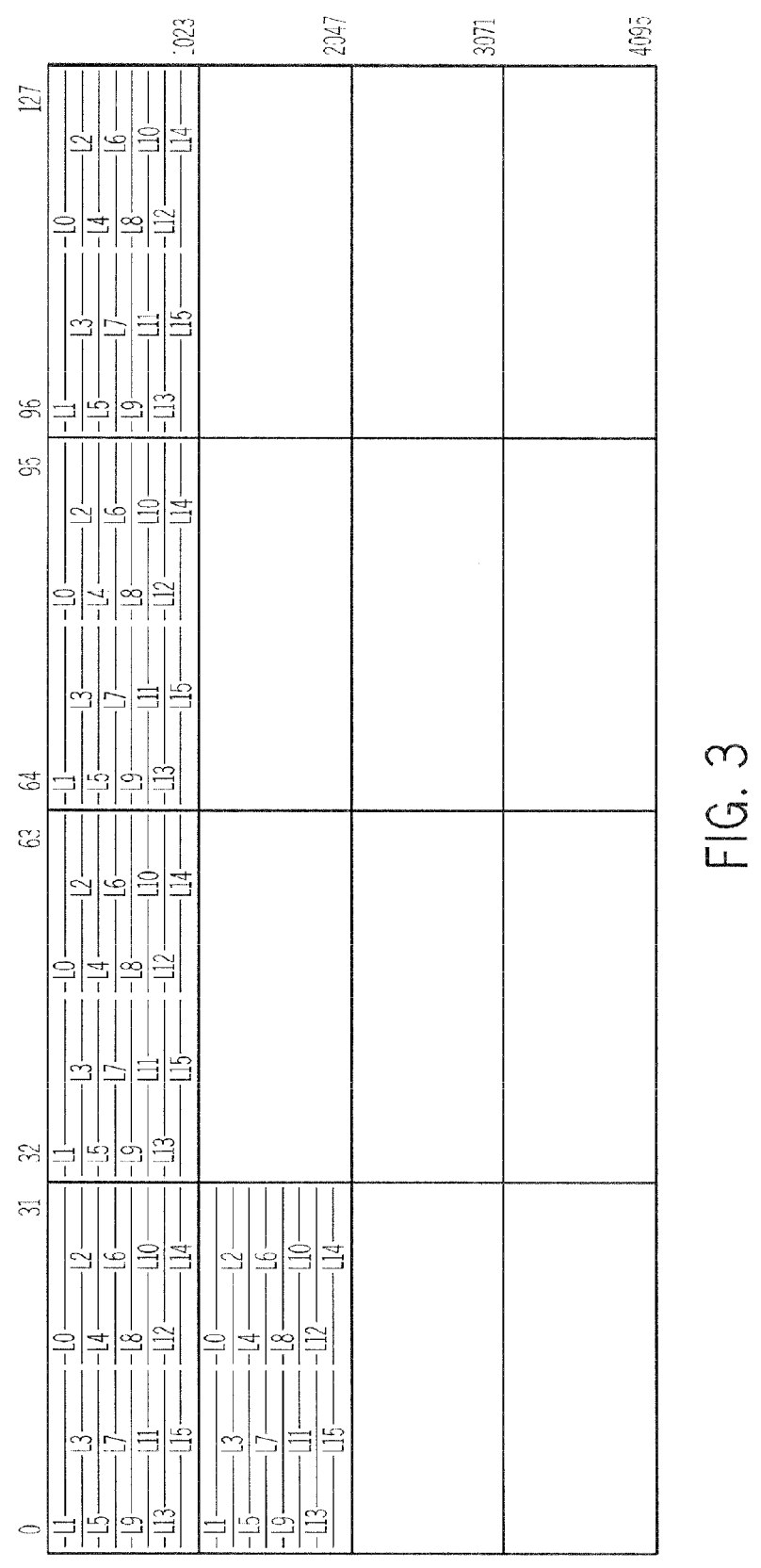

Thus, referring to FIG. 3, the first type of reference block format is depicted. It has a length from 0 to 31, or 32 bytes, and a depth of 8 rows. The symbol "ln" corresponds to the progressive macroblock line number. Thus, FIG. 3 shows the arrangement of rows within each 32×8 macroblock of a first set of five macroblocks of a total of sixteen macroblocks. The remaining macroblocks simply repeat the sequence depicted.

Figure 4:
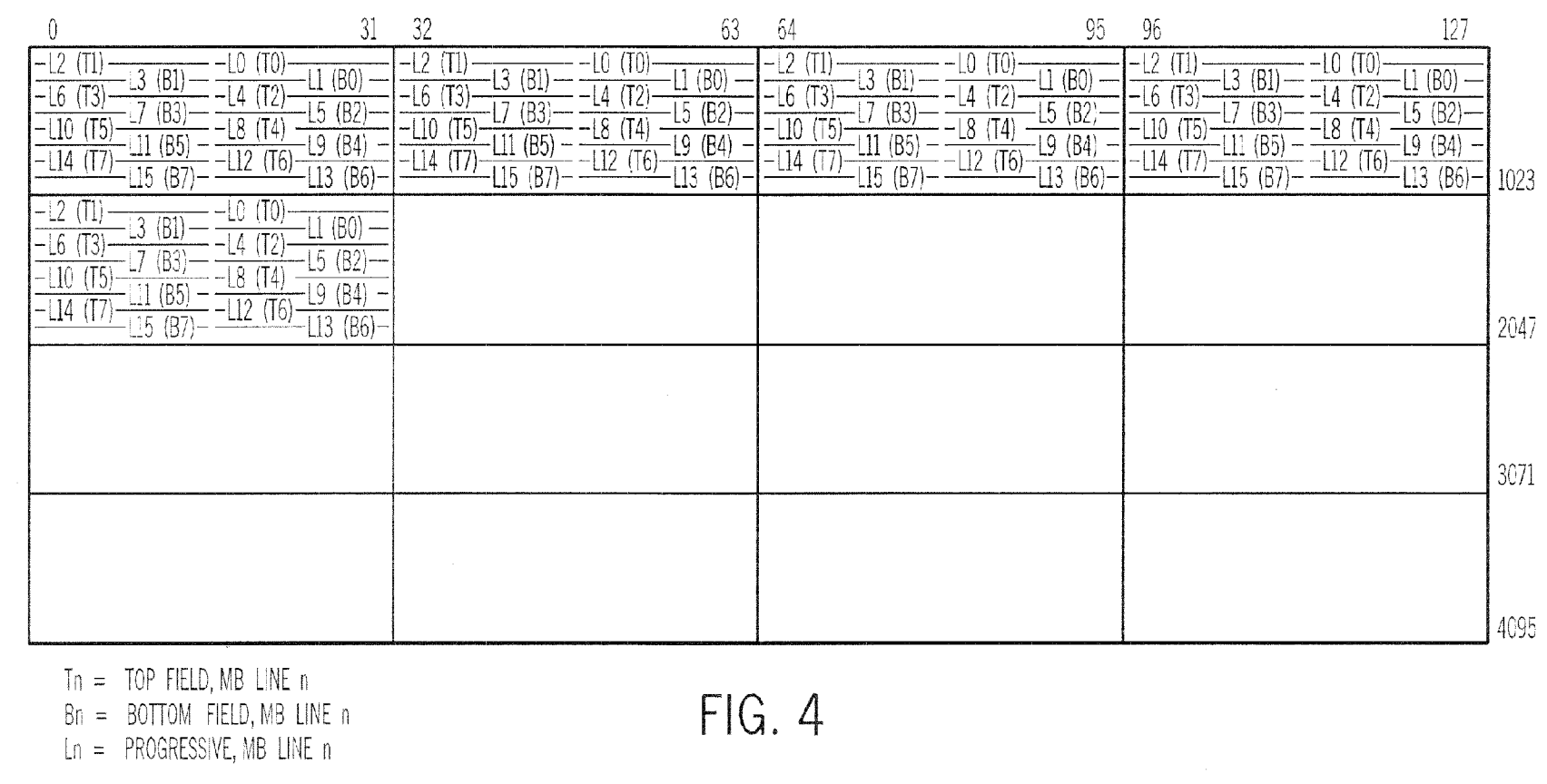

For the picture-adaptive frame-field encoding accesses (also known as picture-level frame/field coding), the format shown in FIG. 4 may be utilized. $T_n$ refers to the top field (that includes the odd lines of the frame of a macroblock) at line n and $B_n$ refers to the bottom field (that includes the even lines of the macroblock) at line n.

As shown in FIG. 4, the top and bottom field lines are remapped onto the 32×8 macroblock format to optimize the bandwidth efficiency for picture-adaptive frame-field encoding in one embodiment. The first row includes two even lines (L2 and L0) from the 16×16 macroblock. The second row includes two odd lines (L3 and L1) from the 16×16 macroblock. Thus, the odd rows make up the top field and the even rows make up the bottom field.

In picture-adaptive frame-field encoding, the video encoder 12 can read by frame (progressively) or by field (for interlaced pictures). If the 32×8 macroblocks in the reference picture are referenced for field based coding, then the encoder fetches the first, third, fifth, and seventh rows for the top field coding and separately fetches the second, fourth, sixth, and eighth rows for the bottom field coding. If the 32×8 macroblocks in the reference picture are referenced for frame based coding, then the coder fetches the first, second, third, and eighth rows in the field bases and frame based coding examples.

All of the 32×8 macroblock lines requested are used by the encoder, in one embodiment, thereby optimizing the bandwidth in some embodiments. The 32 bytes from each row of the 32×8 macroblock may be comprised of consecutive field lines in some embodiments. Using consecutive field lines ensures that the field encoding for all 32 byte bursts are from the same field, top or bottom.

In PAFF, if the macroblock is read out of the buffer 15 progressively, then the read out lines will be out of order. In one embodiment, the bridge 14 is responsible for reordering the lines so that the encoder 12 is oblivious to the reformatting.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the foregoing talks about a 32×8 macroblock, typically the size of a luminance macroblock, a chrominance macroblock may be treated in the same way. Generally, a chrominance macroblock is 32×4 macroblock since there is twice the luminance data as chrominance data. Thus, the present invention applies to both luminance and chrominance macroblocks.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   bursting only one macroblock per request from a video encoder to a buffer whose minimum burst length is greater than one macroblock;
   receiving picture data in a video encoder;
   writing out the picture data from the encoder as a symmetrical macroblock having a length in bytes and a height in lines that are equal;
   converting the macroblock from a symmetrical to asymmetrical macroblock having a length greater than its height and where said symmetrical and asymmetrical macroblocks have the same amount of data;
   providing a macroblock of data from the buffer to the video encoder, said macroblock sized to match the minimum burst length of the buffer;
   only supplying from the buffer with data that can be fully utilized by the video encoder:
   providing an asymmetrically sized macroblock in response to a request from the video encoder to the buffer for reference picture data; and
   storing said asymmetrical macroblock in a buffer.

2. The method of claim 1 including providing a burst transfer of a 32 byte wide by eight row macroblock.

3. The method of claim 1 including using a DDR3 static dynamic random access memory as said buffer.

4. The method of claim 1 including storing a top field as one of even or odd rows in the buffer and storing a bottom field as the other of the even or odd rows.

5. The method of claim 1 including selectively reformatting a macroblock for picture-adaptive frame-field encoding or non-picture-adaptive frame-field encoding.

6. An apparatus comprising:
   a buffer; and
   an encoder to burst only one macroblock per request from a video encoder to a buffer whose minimum burst length is greater than one macroblock, provide a macroblock of data from the buffer to the video encoder, said macroblock sized to match the minimum burst length of the buffer, only supply from the buffer with data that can be fully utilized by the video encoder, provide an asymmetrically sized macroblock in response to a request from the video encoder to the buffer for reference picture data, receive picture data, write out the picture data as a symmetrical macroblock having a length in bytes and a height in lines that are equal, convert the macroblock from a symmetrical to asymmetrical macroblock having a length greater than its height and having the same data as said symmetrical macroblock, and store said asymmetrical macroblock in said buffer.

7. The apparatus of claim 6 wherein said encoder provides a burst transfer of a 32 byte wide by 8 row macroblock.

8. The apparatus of claim 6, said buffer to provide a macroblock of data to said encoder, said macroblock size to match the minimum burst length of the buffer and said buffer to only supply data that can be fully utilized by the video encoder.

9. The apparatus of claim 6 wherein said buffer is a DDR3 static dynamic random access memory.

10. The apparatus of claim 6, said encoder to provide an asymmetrically sized macroblock in response to a request from the video encoder to the buffer for reference picture data.

11. The apparatus of claim 6, said buffer storing a top field as one of even or odd rows and storing a bottom field as the other of even or odd rows.

12. The apparatus of claim 8, said encoder to selectively reformat a macroblock of data for picture-adaptive frame-field encoding or non-picture-non-adaptive frame-field encoding.

13. A non-transitory computer readable medium storing instructions executed by a video encoder to:
   burst only one macroblock per request from the video encoder by a buffer whose minimum burst length is greater than one macroblock;
   receive picture data in the video encoder;
   write out the picture data from the encoder as a symmetrical macroblock having a length in bytes and a height in lines that are equal;
   convert the macroblock from a symmetrical to asymmetrical macroblock having a length greater than its height and having the same data as said symmetrical macroblock;
   store said asymmetrical macroblock in a buffer;
   provide a macroblock of data from the buffer to the video encoder, said macroblock sized to match the minimum burst length of the buffer;
   only supply from the buffer with data that can be fully utilized by the video encoder; and
   provide an asymmetrically sized macroblock in response to a request from the video encoder to the buffer for reference picture data.

14. The medium of claim 13 further storing instructions to provide a macroblock of data from the buffer to the video encoder, said macroblock size to match the minimum burst length of the buffer and only supplying from the buffer with data that can be fully utilized by the video encoder.

15. The medium of claim 13 further storing instructions to provide an asymmetrically sized macroblock in response to a request from the video encoder to the buffer for reference picture data.

16. The medium of claim 13 further storing instructions to store a top field as one of even or odd rows in a buffer and storing a bottom field as the other of even or odd rows.

17. The medium of claim 14 further storing instructions to selectively reformat a macroblock for picture-adaptive frame-field encoding or non-picture-adaptive frame-field encoding.

* * * * *